United States Patent
Shapiro

Patent Number: 5,815,229
Date of Patent: Sep. 29, 1998

[54] MICROLENS IMBEDDED LIQUID CRYSTAL PROJECTION PANEL INCLUDING THERMAL INSULATION LAYER

[75] Inventor: Leonid Shapiro, Lakeside, Calif.

[73] Assignee: Proxima Corporation, San Diego, Calif.

[21] Appl. No.: 701,495

[22] Filed: Aug. 22, 1996

Related U.S. Application Data

[63] Continuation-in-part of Ser. No. 345,601, Nov. 28, 1994, Pat. No. 5,606,436, which is a continuation-in-part of Ser. No. 342,920, Nov. 21, 1994, abandoned.

[51] Int. Cl.⁶ .................. G02F 1/1335; G02F 1/1343
[52] U.S. Cl. .................. 349/95; 349/122; 349/138; 349/105
[58] Field of Search .................. 349/122, 138, 349/105, 95, 62

[56] References Cited

U.S. PATENT DOCUMENTS

| | | | |
|---|---|---|---|
| 5,101,279 | 3/1992 | Kurematsu et al. | 349/95 |
| 5,276,538 | 1/1994 | Monji et al. | 349/95 |
| 5,680,186 | 10/1997 | Watanabe et al. | 349/95 |
| 5,682,180 | 10/1997 | Young et al. | 345/150 |
| 5,682,215 | 10/1997 | Nishihara et al. | 349/95 |

FOREIGN PATENT DOCUMENTS

| | | | |
|---|---|---|---|
| 62-27723 | 11/1987 | Japan | 349/106 |
| 3-2826 | 1/1991 | Japan | 349/106 |

*Primary Examiner*—William L. Sikes
*Assistant Examiner*—Kenneth Parker
*Attorney, Agent, or Firm*—Higgs, Fletcher & Mack LLP; Bernard L. Kleinke

[57] ABSTRACT

A liquid crystal projection panel construction includes an incident light substrate assembly spaced apart from an light exiting substrate assembly having a plurality of pixel elements for enclosing a liquid crystal assembly therebetween. The incident light substrate assembly includes a microlens array having a plurality of microlenses disposed at about a surface of engagement between the incident light substrate assembly and the liquid crystal assembly for converging light through corresponding pixel elements. The incident light substrate assembly further includes a plurality of interference filters disposed at about the surface of engagement, and in registration with the corresponding microlenses and pixel elements for projecting a bright, high quality, full color image.

16 Claims, 3 Drawing Sheets

MICROLENS IMBEDDED LIQUID CRYSTAL PROJECTION PANEL INCLUDING THERMAL INSULATION LAYER

CROSS REFERENCE TO RELATED APPLICATIONS

This application is a continuation-in-part patent application of U.S. patent application Ser. No. 08/345,601, filed Nov. 28, 1994, entitled "LIQUID CRYSTAL PROJECTION PANEL CONSTRUCTION AND METHOD OF MAKING SAME," now U.S. Pat. No. 5,606,436, which is a continuation-in-part of U.S. patent application Ser. No. 08/342,920, filed on Nov. 21, 1994, entitled "LIQUID CRYSTAL PROJECTION PANEL CONSTRUCTION AND METHOD OF MAKING SAME," now abandoned.

TECHNICAL FIELD

The present invention relates in general to an improved high resolution full color single liquid crystal projection panel construction, and a method of making it. The invention more particularly relates to a liquid crystal projection panel construction which enables an image to be projected in bright full color, and which is constructed according to a novel method to be small in size and relatively inexpensive to manufacture.

BACKGROUND ART

There have been many types and kinds of projection systems for projecting bright full color images onto a remote viewing surface. One such system utilizes three liquid crystal display panels to generate red, green, and blue monochromatic images. Each liquid crystal display has an associated color dye or pigment filter to produce each of the monochromatic images.

While such a system provides an adequate full color image, the system is relatively large in size. Thus, a bulky housing must be employed to accommodate the three liquid crystal displays so constructed and arranged for combining the monochromatic images. Furthermore, such a system is relatively expensive to manufacture, since three liquid crystal displays are employed. Thus, it is desirable to have a full color panel construction which is extremely compact in size and relatively inexpensive to manufacture, at the same time, such a panel construction should be capable of projecting bright full color images.

To reduce the size and expense of a full color projection panel construction, systems have been devised which utilize a single active matrix liquid crystal display (AMLCD). The AMLCD is comprised of a large number of monochromatic sub-pixels arranged in a triad or stripe arrangement, wherein each triad or group of three stripes forms a single full color pixel element. To produce the monochromatic sub-pixels, color dye or pigment filters are attached or deposited on the AMLCD to absorb unwanted wavelengths of light. One dye or pigment filter for each sub-pixel is required to achieve the triad or stripe full color pixel.

Although such a single panel construction has been successful in producing full color projected images, the size and efficiency of the AMLCD panel has been constricted by the physical limitations of the dye or pigment filters. In this regard, the dye or pigment filter functions by absorbing unwanted wavelengths of light and permitting a desired wavelength to pass therethrough. To accomplish this, the filters must have certain physical attributes, such as the proper thickness to absorb completely the unwanted wavelengths of light. Thus, the thickness of the filter limits the acceptable thickness of the combination of the AMLCD and the filter.

In addition to the size limitations of the dye or pigment filter, the inefficiency of the filter also detracts from its overall suitability. The absorption of unwanted wavelengths of light generates heat within the dye or pigment filter, adversely affecting its ability to absorb light. Such heat can be transmitted to the AMLCD, thereby affecting adversely the proper operation of the AMLCD which contains a heat sensitive liquid crystal material. Furthermore, dye or pigment filters are relatively hard to etch or deposit on glass during fabrication.

Therefore, it would be highly desirable to have a new and improved projection panel construction, which is relatively small in size, and yet highly efficient to produce bright full color images. Such a construction should be relatively inexpensive to manufacture.

In addition to the foregoing desirable characteristics, it would be further desirable to have such a panel construction, which can produce a high resolution image, and which at the same time can be relatively small in size.

A problem in reducing the overall size of such a panel construction has been the reduction of the pixel element aperture ratio. The aperture ratio refers to the actual area of the thin film transistor layer deposited on the AMLCD which activates the liquid crystal to modulate light passing therethrough relative to the area which does not activate the liquid crystal. The area of the thin film transistor layer which does not activate the liquid crystal is comprised of electrical circuit elements to transmit signals to the area which does activate the liquid crystal. As pixel density increases, which occurs when the size of the AMLCD is reduced, the activating area is reduced substantially in proportion to the non-activating area, thus the decrease in aperture ratio.

The reduction of the aperture ratio results in a reduction of the transmissivity of the AMLCD panel. Lower transmissivity detrimentally affects the brightness of the projected full color image.

U.S. Pat. No. 5,381,187 discloses an image display apparatus for helping to increase the brightness of a projected image. The apparatus includes a liquid crystal display (LCD) panel having a pair of spaced apart relatively thick glass substrates enclosing a layer of liquid crystal material. The LCD panel further includes a plurality of picture elements for forming an image.

A microlens array having a plurality of microlenses is disposed on the light incident side of one of the glass substrates of the LCD panel for converging projection light through the glass substrate and onto the corresponding picture elements. The microlens array is secured to the glass substrate by an adhesive layer having a thickness of 10 to 100 microns. Thus, the microlenses are spaced apart from the picture elements by at least the thickness of the glass substrate plus the thickness of the adhesive layer. A typical thickness for an LCD panel glass substrate is approximately 750 microns. The microlenses are further separated from the picture elements by the thickness of color filters interposed between the microlenses and the adhesive layer. As a result, the microlenses of the '187 patent apparatus could be separated from the picture elements typically by about 760 microns or more.

Although the use of the microlens array enables the projection light to be used more efficiently, the focal distance between the microlenses and the picture elements renders the apparatus susceptible to cross talk due to the unduly and excessively large size of the focused spot. Cross talk refers to converging light from a microlens striking an adjacent picture element in addition to the picture element corresponding to the microlens. As a result, the uniform distribution of the projection light to the picture elements is affected, thereby detrimentally affecting the quality of the projected image.

Therefore, it would be highly desirable to have a new and improved panel construction, which is extremely compact in size, and having a high density of pixel elements to produce a high resolution, bright, and full color image. Such a panel construction should substantially reduce or eliminate cross talk to maintain the quality of the projected image. Additionally, such a panel construction should be relatively inexpensive to manufacture.

DISCLOSURE OF INVENTION

Therefore, the principal object of the present invention is to provide a new and improved liquid crystal display projection panel construction, and a method of making it, wherein the panel construction is relatively small in size, substantially reduces or eliminates cross talk, and is relatively inexpensive to manufacture.

Another object of the present invention is to provide such a new and improved panel construction which has a relatively high density of pixel elements to produce a high resolution image, and which projects a bright full color image.

Briefly, the above and further objects of the present invention are realized by providing a new and improved liquid crystal display projector panel construction which can be manufactured according to a novel method of the present invention.

A liquid crystal projection panel construction includes an incident light substrate assembly spaced apart from a light exiting substrate assembly having a plurality of pixel elements for enclosing a liquid crystal assembly therebetween. The incident light substrate assembly includes a microlens array having a plurality of microlenses disposed at about a surface of engagement between the incident light substrate assembly and the liquid crystal assembly for converging light through corresponding pixel elements. The incident light substrate assembly further includes a plurality of interference filters disposed at about the surface of engagement, and in registration with corresponding microlenses and pixel elements for projecting a bright, high quality, full color image.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
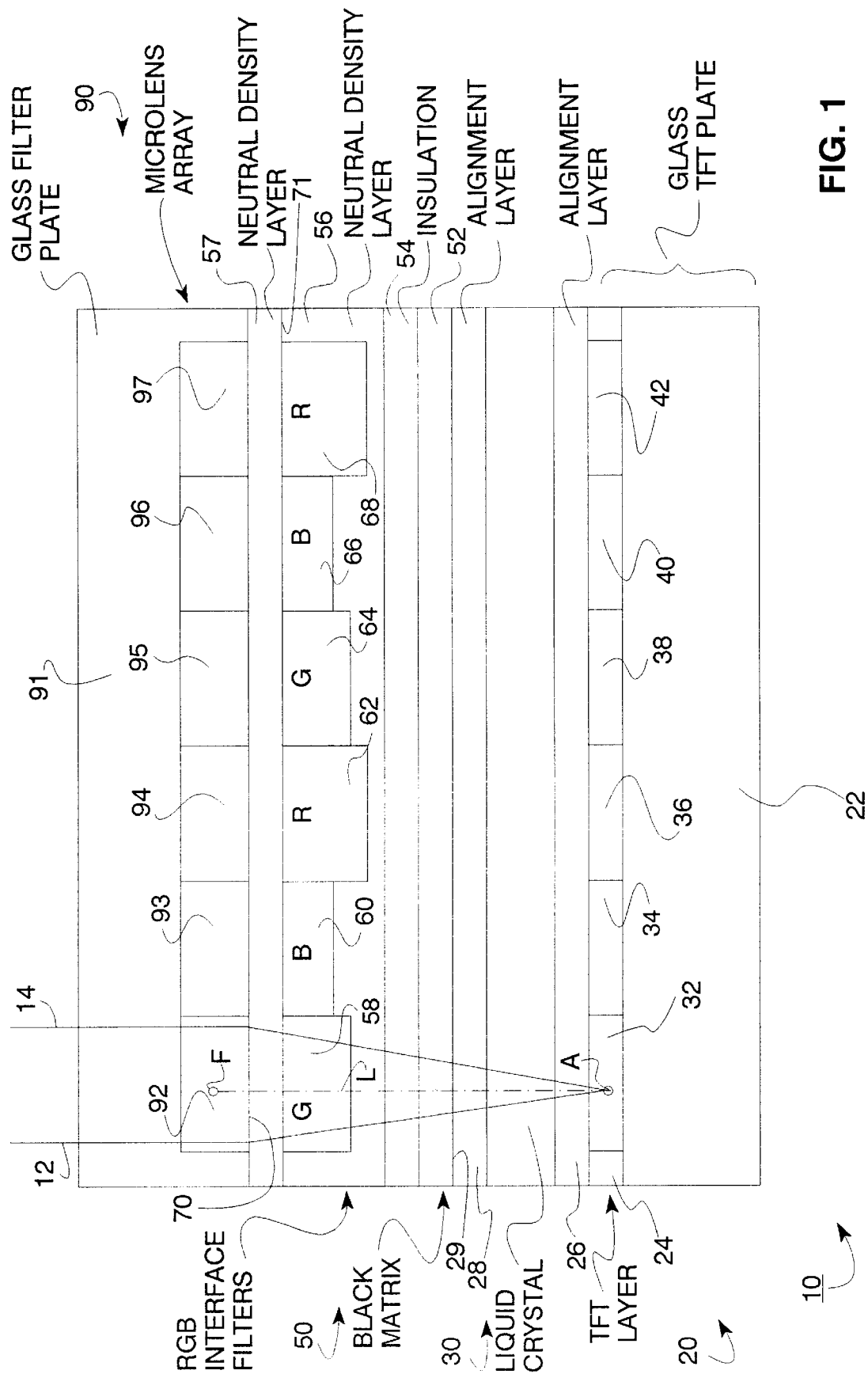
FIG. 1 is a diagrammatic cross-sectional view of a liquid crystal display projection panel construction, which is constructed in accordance with the present invention.

Referring now to the drawings, more particularly FIG. 1 thereof, there is shown a liquid crystal display projection panel construction 10, which is constructed in accordance with the present invention. It will be understood by one skilled in the art that FIG. 1 is diagrammatical and is not intended to accurately set forth the physical dimensions of the panel construction 10.

The projection panel construction 10 generally comprises an incident light substrate assembly 90, a light exiting substrate assembly 20 spaced apart from the incident light substrate assembly 90, and a liquid crystal assembly 30 disposed between the incident light substrate assembly 90 and the opposite substrate assembly 20 to define a single active matrix liquid crystal display (AMLCD) panel for modulating light passing therethrough to facilitate the projection of a bright, high quality image. A surface of engagement 29 is defined by the incident light substrate assembly 90 abutting the liquid crystal assembly 30.

The incident light substrate assembly 90 has a thickness of about 700 microns and includes a glass filter plate or substrate 91, and an optical assembly 50 disposed between the glass substrate 91 and the liquid crystal assembly 30 at about the surface of engagement 29 for focusing incident light to enhance the optical efficiency of the panel construction 10, as will be described hereinafter in greater detail. The optical assembly 50 has a thickness of up to about 300 microns. More preferably, the optical assembly 50 has a thickness of between about 20 microns and about 100 microns. Even more preferably, the optical assembly 50 has a thickness of between about 30 microns and about 50 microns. Most preferably, the optical assembly 50 has a thickness of about 40 microns. As a result, the focal distance, such as the focal distance L, is determined by the thickness of the optical assembly 50, and thus the lenslets are spaced by a spacing distance from the liquid crystal assembly 30 at the surface 29 by the thickness of the optical assembly 50.

Figure 2:
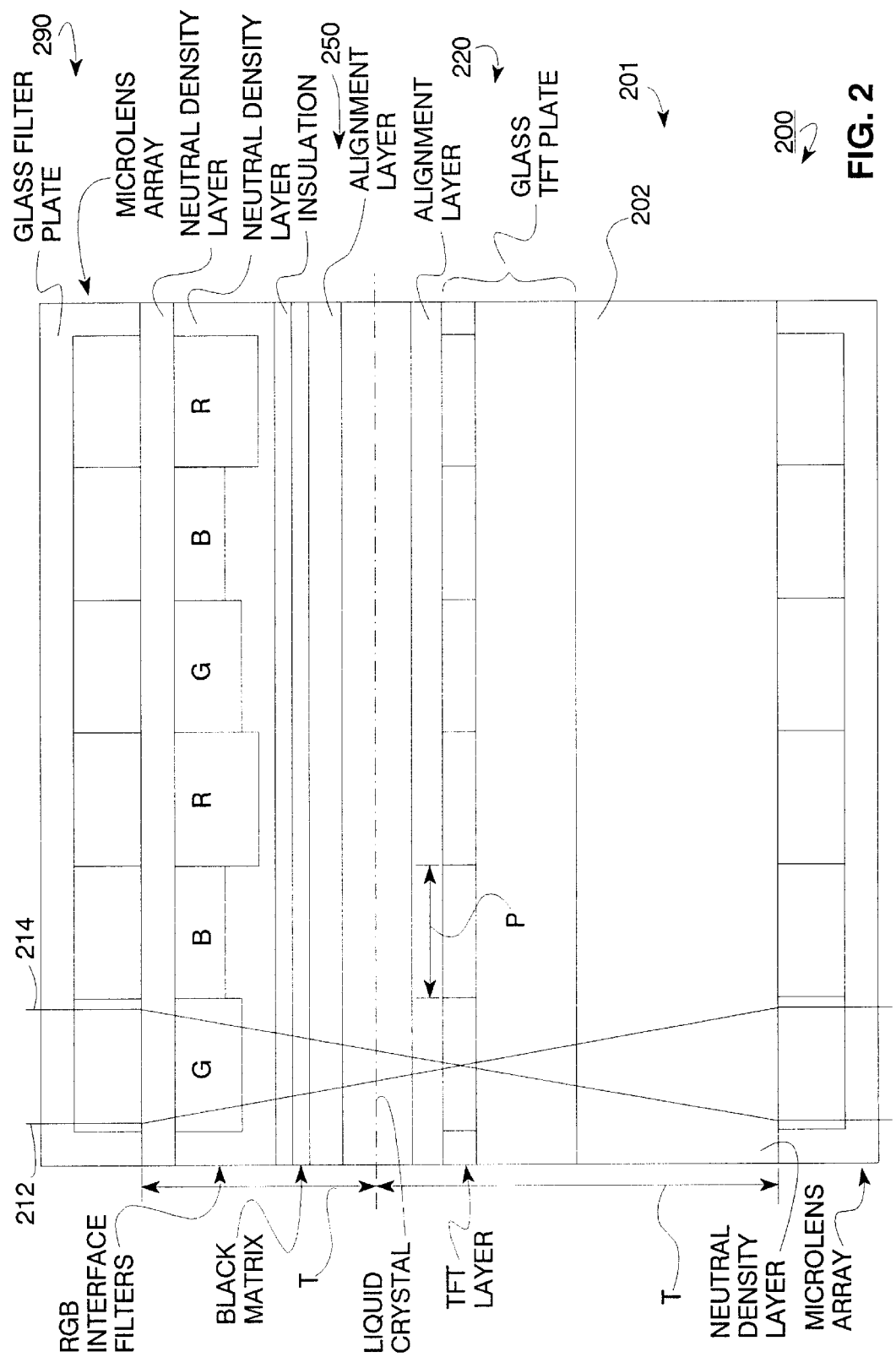
FIG. 2 is a diagrammatic cross-sectional view of another liquid crystal display projection panel, which is also constructed in accordance with the present invention.

Thus, the overall thickness of the incident light substrate assembly 90 remains at about 750 microns corresponding to the thickness of the glass substrate of prior known panel constructions, such as the glass substrate 121 illustrated in FIG. 2 of U.S. Pat. No. 5,381,187, which patent is incorporated by reference as if fully set forth herein. However, the thickness of the substrate 91 varies, depending upon the thickness of the optical assembly 50, to maintain the overall thickness of substrate assembly 90 at about 750 microns.

The liquid crystal assembly 30 includes a liquid crystal material disposed between a pair of spaced apart alignment layers 26 and 28 for cooperating with the opposite substrate assembly 20 to modulate the light passing through the panel construction 10. To facilitate the modulation of the light, the opposite substrate assembly 20 includes a plurality of pixel elements, such as pixel elements 32, 34, 36, 38, 40, and 42 which help separate the modulated light into several controllable elements. Each of the pixel elements 32, 34, 36, 38, 40 and 42 has an associated aperture, such as the aperture A of pixel element 32, which is indicative of a transmissive portion of the respective pixel element.

To enable the incident light passing through the incident light substrate assembly 90 to converge toward the aperture of pixel elements 32, 34, 36, 38, 40 and 42, the optical assembly 50 includes a lenticular lenslet or microlens array having a plurality of individual lenslets 92, 93, 94, 95, 96 and 97 disposed in close proximity to the surface of engagement 29. The lenslets 92, 93, 94, 95, 96 and 97 are aligned in registration with corresponding pixel elements 32, 34, 36, 38, 40 and 42, and facilitate the convergence of the incident light toward the apertures, such as an aperture A, of the pixel elements 32, 34, 36, 38, 40 and 42. By disposing the lenslets 92, 93, 94, 95, 96 and 97 near the surface of engagement 29, the focal distance between the lenslets 92, 93, 94, 95, 96 and the corresponding pixel elements 32, 34, 36, 38, 40 and 42 is relatively small, as compared to the prior known panels, such as the one disclosed in U.S. Pat. No. 5,381,187. As a result, the possibility of cross talk between adjacent lenslet/pixel element combinations, is substantially reduced or eliminated.

The inventive projection panel construction 10 provides a higher quality image due to the elimination or substantial reduction of pixel element cross talk in a compact single panel. Prior known display panels having lenslets mounted on the outside or light incident back side thereof, such as the one disclosed in U.S. Pat. No. 5,381,187, suffer from excessive and unwanted pixel element cross talk.

The inventive projection panel construction 10 achieves the desired elimination or substantial reduction of undue cross talk by mounting the lenslets, such as the lenslet 92 in the light incident assembly 10 in relatively close proximity to the liquid crystal assembly 30, instead of externally on or at the back side thereof as previously proposed by the prior art. The lenslets are thus mounted within relatively close proximity to the liquid crystal assembly 30. In this regard, the lenslets are preferably spaced from the surface of engagement 29 at the light incident side of the liquid crystal assembly 30 by a distance of up to about 300 microns (the thickness of the optical assembly 50). In this manner, the lenslets, such as the lenslet 92, focus light along the relatively short focal length or distance L to a point which is sufficiently small in size as compared to the size of the corresponding apertures, such as the aperture A, to enter the apertures with little or no cross talk.

The optical assembly 50 further includes a plurality of individual interface filters 58, 60, 62, 64, 66 and 68 corresponding in number to lenslets 92, 93, 94, 95, 96 and 97 and pixel elements 32, 34, 36, 38, 40 and 42, and aligned in registration therewith. It will be understood by one skilled in the art that FIG. 1 is diagrammatic, and only six combinations of filter/lenslet/pixel element are shown for purposes of clarity. The filters 58, 60, 62, 64, 66 and 68 selectively pass incident light therethrough for facilitating the generation of a full color image by the panel construction 10. In this regard, filters 58 and 64 pass green light, filters 60 and 66 pass blue light, and filters 62 and 68 pass red light.

In use, incident light rays, such as light rays 12 and 14, pass through the glass substrate 91 before reaching the lenslets, such as lenslet 92. The lenslet 92 causes the incident light to converge to the aperture A within the aligned corresponding pixel element 32. The converging light passes through the interface filter 58. The interface filter 58 permits light having a wavelength corresponding to the color green to pass therethrough, while reflecting or dispersing all other wavelengths of light. In this way, only converging green light is permitted to reach the aperture A of the pixel element 32.

The pixel element 32 is electronically controlled to modulate the green light passing through the aperture A. In this way, a green pixel image is formed. Pixel elements 34, 36, 38, 40, and 42 operate in a similar manner to generate blue and red pixel images, as well as red pixel images, to form a full color image.

Considering now the light exiting substrate assembly 20 in greater detail, the substrate assembly 20 includes a glass substrate 22, which could comprise a quartz glass substrate, having a thin layer of amorphous silicon or polysilicon material deposited thereon to help form a drive circuit or TFT layer 24. The TFT devices (not shown) are formed in the amorphous silicon or polysilicon layers by methods known in the art.

The TFT layer 24 includes the pixel elements 32, 34, 36, 38, 40, and 42 which are controlled by corresponding drive circuitry (not shown) in the TFT layer 24. It will be understood by one skilled in the art that the pixel elements 32, 34, 36, 38, 40, and 42 as shown in FIG. 1, are illustrated in a diagrammatic representational form only, and that spaces between the elements may exist.

The light exiting substrate assembly 20 provides relatively high resolution capability for a given size. In this regard, the number of pixel elements in a single dimension is increased threefold to provide three times the number of pixel elements. For example, a 640×480 array of pixel elements is expanded to a 1920×480 array. However, the increased number of pixel elements is accomplished within the same surface area previously occupied by one third as many pixels.

The increase of pixel elements within an area that remains constant results in a higher density of pixel elements. The physical properties of the amorphous silicon or polysilicon layer enables the pixel element density to be increased without a substantial detrimental effect to the aperture ratio while enabling the electrical circuitry corresponding to the increased number of pixel elements to be accommodated on the opposite substrate assembly 20.

Considering now the optical assembly 50 in greater detail, the optical assembly 50 includes a black matrix 52 for controlling the converging light passing therethrough for facilitating the reduction of optical cross talk. The black matrix 52 is disposed between the surface of engagement 29 and the lenslets 92, 93, 94, 95, 96 and 97. While the location of the black matrix 52 is described and shown as being disposed at about the surface 29, the black matrix 52 may also be located elsewhere within the optical path, such as on the TFT layer 24 between the pixel elements 32, 34, 36, 38, 40 and 42.

An insulation layer 54 is disposed between the interference filters 58, 60, 62, 64, 66, and 68 and the liquid crystal assembly 30 to substantially reduce the amount of heat produced by the interaction of the light with the filters, and which reaches the liquid crystal assembly 30. The interference filters 58, 60, 62, 64, 66, and 68 are each aligned optically with the respective pixel elements 32, 34, 36, 38, 40, and 42 for permitting the desired wavelengths of light to pass through while blocking undesired wavelengths of light.

The thickness of each interference filter 58, 60, 62, 64, 66, and 68 is dependent upon the particular wavelength of light which is permitted to pass therethrough. Thus, the filter thicknesses vary, depending upon whether red, green or blue light is permitted to pass through the filters 58, 60, 62, 64, 66, and 68. By using multilayer, or all-dielectric, interference filters, undesired wavelengths of light are reflected or dispersed without creating additional heat and simultaneously permitting the maximum amount of desired light wavelengths to pass through. The interference filters 58, 60, 62, 64, 66, and 68 eliminate unwanted wavelengths of light by destructive interference.

A neutral density layer 56 surrounds the interference filters 58, 60, 62, 64, 66, and 68 to space them apart from the insulation layer 54. As a result of the different thicknesses of the interference filters 58, 60, 62, 64, 66, and 68, the neutral density layer 56 has a varying thickness to compensate for the different thicknesses of the respective interference filters. It will be understood by one skilled in the art that the thickness of the neutral density layer 56 can be reduced or even eliminated, depending upon the focal length of the lenslets as described hereinafter. In this regard, the thickness of the neutral density layer 56 and the focal lengths of the lenslets are interdependent. Adjusting one requires adjusting the other to maintain the correct convergence of light. As a result, the thickness of the neutral density layer 56 can be adjusted to accommodate the focal lengths of the lenslets.

The optical assembly 50 further includes another neutral density layer 57 interposed between the filters 58, 60, 62, 64, 66 and 68, and the lenslets 92, 93, 94, 95, 96 and 97 to accommodate the focal lengths of the lenslets 92, 93, 94, 95, 96 and 97. Neutral density layer 57 includes a deposition surface 71. The layer 57 is between approximately 10 microns and approximately 200 microns thick to accommodate the desired individual focal length optic paths of the lenslets 92, 93, 94, 95, 96 and 97, and has a substantially uniform thickness throughout. A more preferred range is between about 10 microns and about 30 microns, and a most preferred thickness is about 20 microns. The filters 58, 60, 62, 64, 66 and 68 are formed on and secured to the deposition surface 71 by methods known in the art, such as by a suitable deposition process.

Considering now the individual lenslets 92, 93, 94, 95, 96, and 97 in greater detail, the individual lenslets 92, 93, 94, 95, 96, and 97 are fabricated by diffusion or ion exchange on the inner surface of the glass plate 91, and are aligned in registration with the respective interference filters 58, 60, 62, 64, 66, and 68, and the respective pixel elements 32, 34, 36, 38, 40, and 42.

Other methods for fabricating the lenslets 92, 93, 94, 95, 96, and 97 are also contemplated. For example, the lenslets 92, 93, 94, 95, 96, and 97 could be fabricated from molded plastic or another similar fabrication method. Diffractive optics could also be used. The tolerances on the fabrication of the lenslet array 90 must be relatively tight to minimize optical scattering at lenslet boundaries and other anomalies. Furthermore, the alignment of the individual lenslets 92, 93, 94, 95, 96 and 97 is critical, and should be controlled tightly relative to the pixel pitch P.

Considering now the construction of the lenslets 92, 93, 94, 95, 96, and 97, only lenslet 92 will be considered in greater detail hereinafter as each of the lenslets are substantially similar. Lenslet 92 is preferably rectangular and configured to permit its profile or footprint to be about equal to the lines along the centers of the pixel element boundaries. While lenslet 92 is preferably rectangular, other shapes may also be accommodated. The focal length of the lenslet 92 is fabricated to be substantially equal to the length L between the point F to the aperture A. In this way, the incident light rays 12 and 14 converge at about the central portion of the pixel element 32 corresponding to the aperture A. The lenslet 92 may be immersed in a refractive index greater than unity, for example 1.5, and the length L should be appropriate to focus the light at the aperture A.

Due to the construction of the panel construction 10, the focal length is substantially reduced relative to conventional panels having microlenses attached at the outside or light incident back side thereof.

Referring now to FIG. 2 there is shown another high resolution LCD projection panel construction 200. It will be understood that FIG. 2 is diagrammatic for ease of illustration, and is not intended to accurately define physical dimensions. The panel construction 200 includes an incident light substrate assembly 290 having an optical assembly 250 and a liquid crystal assembly, which are substantially similar to the incident light substrate assembly 90 having the optical assembly 50 and the liquid crystal assembly 30, respectively, of FIG. 1, and will not be discussed in greater detail hereinafter.

The panel construction 200 further includes a light exiting substrate assembly 220 which is substantially similar to light exiting substrate assembly 20 of FIG. 1, and includes a TFT layer and a glass substrate substantially similar to TFT layer 24 (FIG. 1) and glass substrate 22 (FIG. 1), respectively. However, the light exiting substrate assembly further includes a light exiting optical assembly 201 for collimating light modulated by the liquid crystal assembly.

In this regard, the light exiting optical assembly 201 includes a microlens array having a plurality of lenslets substantially similar to the lenslets 92, 93, 94, 95, 96 and 97 (FIG. 1), corresponding in number to the lenslets in the optical assembly 250, and aligned in registration with the corresponding lenslets of optical assembly 250 and the corresponding pixel elements of the light exiting substrate assembly 220. The lenslets of the light exiting optical assembly 201 intercept the diverging light rays which have passed through the pixel elements to collimate them for enabling the projection of pixel information with relatively little or no optical cross talk.

The lenslets of optical assembly 250 and the light exiting optical assembly 201 each have an effective focal length of thickness T. A neutral density layer 202 is disposed between the glass plate of the light exiting substrate assembly 220 and the lenslets of the light exiting optical assembly 201 to facilitate the adjustment of the effective focal length. The alignment of lenslets in the optical assembly 250 and the light exiting optical assembly 201 should be controlled relative to the pixel pitch P.

Figure 3:
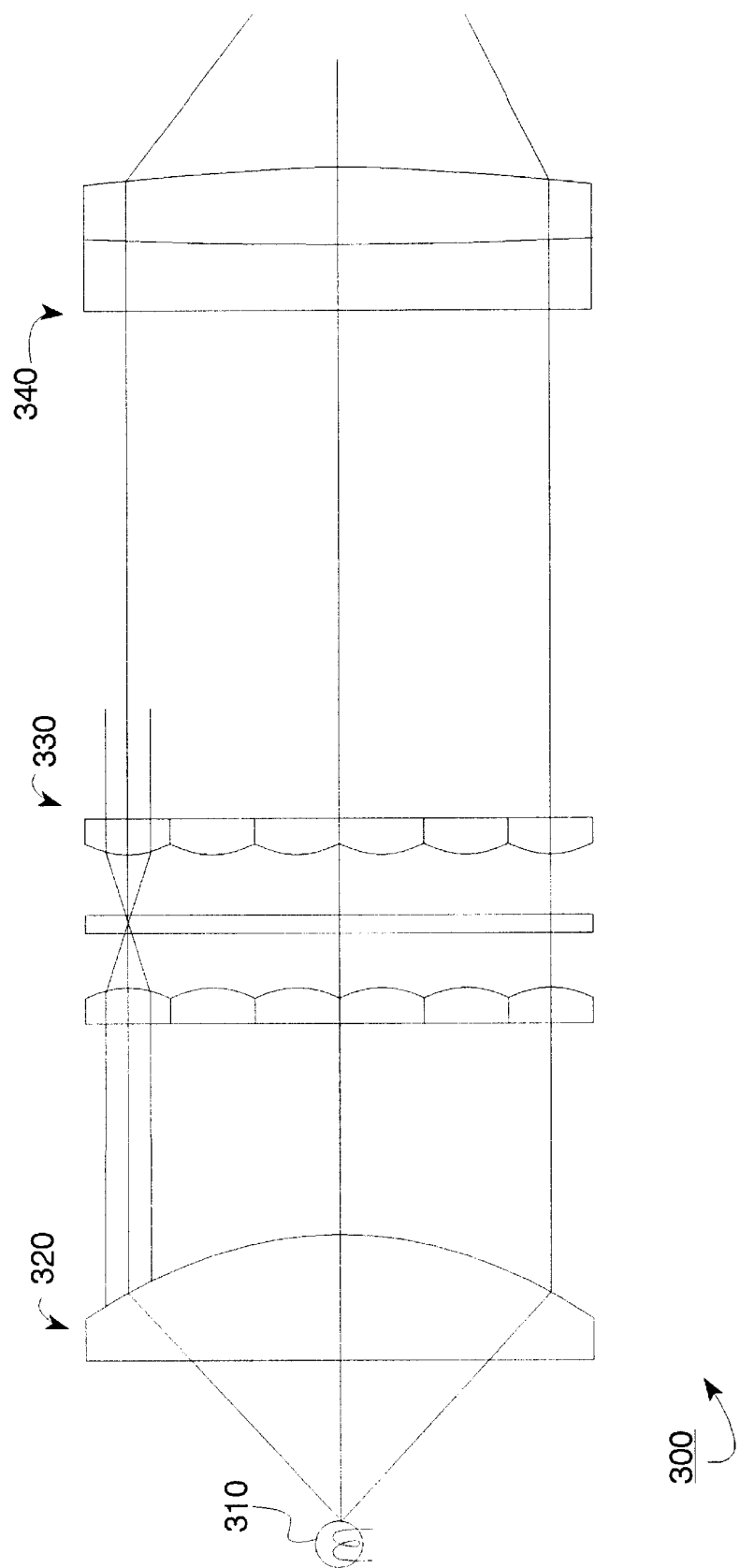
FIG. 3 is a diagrammatic view of a liquid crystal display projection system, which is also constructed in accordance with the present invention.

Referring now to FIG. 3, there is shown a liquid crystal display projection system 300 which is also constructed in accordance with the present invention. The projection system 300 includes a light source 310, a collimating optical lens 320 to collimate light from the light source 310, a high resolution LCD projection panel construction 330 which is substantially similar to the high resolution LCD projection panel construction 200 (FIG. 2) to modulate the collimated light for generating an image to be projected, and a telecentric projection lens 340 to project the image onto a remote surface (not shown).

In operation, the light source 310 generates non-collimated light. The non-collimated light impinges on the collimating optical lens 320 wherein the light exits the lens 320 as collimated light. The collimated light passes through the panel construction 330 substantially free from cross talk interference and in an efficient manner, wherein the light is modulated to generate a bright image. The modulated light exits the panel construction 330 as substantially collimated light before passing through the telocentric projection lens 340 for projecting the resulting high quality, bright image on to the remote surface.

Although the foregoing describes the use of a polysilicon active matrix liquid crystal display in the inventive high resolution LCD projection panel construction, other active matrix liquid crystal displays may also be used to obtain satisfactory results. For example, a single crystal silicon transferring panel as manufactured by Kopin of Taunton, Massachusetts will also work, as will a silicon on sapphire active matrix liquid crystal display.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A liquid crystal projection panel construction, comprising:

liquid crystal assembly means being disposed between said glass substrate to form said panel construction, and including a liquid crystal material for modulating light to generate an image to be projected;

a light exiting glass substrate;

an incident light glass substrate;

said light exiting glass substrate including a plurality of pixel elements for controlling said liquid crystal material;

said incident light glass substrate spaced apart from said light exiting glass substrate for enclosing said liquid crystal assembly means therebetween to form said panel construction, wherein said liquid crystal assembly means and said incident light glass substrate abut at a surface of engagement;

said incident light glass substrate including microlens means having a plurality of lenslets disposed closely spaced by a given optical distance relative to said pixel elements and in registration therewith for focusing light through said pixel elements to enable substantially all of the light to be used for generating said image;

an optical assembly being thin as compared to the thickness of said incident light glass substrate and being disposed between said liquid crystal assembly means and said microlens means at about a surface of engagement with said liquid crystal assembly means for determining the focal distance by spacing said microlens means from said liquid crystal assembly means; said optical assembly includes a plurality of individual interface filters corresponding to said lenslets and pixel elements and aligned in registration therewith for passing selectively incident light therethrough to facilitate the generation of a full color image, at least one neutral density layer disposed between said lenslets and said surface for adjusting said focal distance, and an insulation layer disposed between the neutral density layer and the lenslets to reduce the amount of heat produced by the interaction of the light with said filters; and whereby the occurrence of optical cross talk between adjacent lenslets is substantially reduced.

2. A panel construction according to claim 1, wherein said plurality of optical filters includes at least a red filter, a green filter and a blue filter to facilitate the generation of full color images.

3. A panel construction according to claim 1, wherein said optical assembly means further includes another neutral density layer disposed between said plurality of lenslets and said surface.

4. A panel construction according to claim 1, wherein said optical assembly means further includes a black matrix.

5. A panel construction according to claim 1, wherein said light exiting substrate assembly means further includes a light exiting optical assembly means including another plurality of lenslets for collimating light after it has passed through said liquid crystal material, said another plurality of lenslets corresponding to, and aligned in registration with, said plurality of lenslets, said plurality of optical filters and said plurality of pixel elements to facilitate the focusing of the image.

6. A panel construction according to claim 5, wherein said light exiting optical assembly means further includes a neutral density layer disposed between said another plurality of lenslets and said liquid crystal assembly means.

7. A panel construction according to claim 6, wherein said plurality of lenslets and said another plurality of lenslets have a substantially equivalent effective focal length.

8. A method of making a liquid crystal projection panel construction, comprising:

using a liquid crystal assembly means including a liquid crystal material, a light exiting substrate assembly means including a plurality of pixel elements, and an incident light substrate assembly means including an optical assembly means having microlens means comprising a plurality of lenslets;

disposing said liquid crystal assembly means between said incident light substrate assembly means and said light exiting substrate assembly means to enclose it therebetween, wherein said liquid crystal assembly means and said incident light substrate assembly means abut at a surface of engagement;

disposing said optical assembly means sufficiently close to said surface at a relatively short focal distance to focus light through said pixel elements with said optical assembly means to enable substantially all of the light to be used for generating an image;

disposing a plurality of individual interface filters corresponding to said lenslets and pixel elements in aligned registration therewith for passing selectively incident light therethrough to facilitate the generation of a full color image;

disposing at least one neutral density layer between said lenslets and said surface for adjusting said focal distance, and disposing an insulation layer between the neutral density layer and the lenslets to reduce the amount of heat produced by the interaction of the light with said filters; and whereby the occurrence of optical cross talk between adjacent lenslets is substantially reduced.

9. A method according to claim 8, further including positioning the plurality of lenslets from said surface of engagement by a spacing distance of up to about 300 microns.

10. A method according to claim 9, wherein said spacing distance is between about 20 microns and about 100 microns.

11. A method according to claim 10, wherein said spacing distance is between about 30 microns and about 50 microns.

12. A method according to claim 11, wherein said spacing distance is 40 microns.

13. A method according to claim 8, further including disposing another neutral density layer within said optical assembly means and between said plurality of lenslets and said surface.

14. A method according to claim 8, further including disposing a black matrix within said optical assembly means.

15. A method according to claim 8, further including disposing another plurality of lenslets within said light exiting substrate assembly means, and aligning said another plurality of lenslets in registration with said plurality of lenslets, said plurality of optical filters and said plurality of pixel elements.

16. A liquid crystal display projector, comprising:

a liquid crystal projection panel construction including a liquid crystal assembly means including a liquid crystal material for modulating light to generate an image to be projected, light exiting substrate assembly means including a plurality of pixel elements for controlling said liquid crystal material, incident light substrate assembly means spaced apart from said light exiting substrate assembly means for enclosing said liquid crystal assembly means therebetween, wherein said liquid crystal assembly means and said incident light substrate assembly means abut at a surface of engagement, said incident light substrate assembly means including an optical assembly means disposed at about said surface for focusing light through said pixel elements to enable substantially all of the light to be used for generating said image, whereby the occurrence of optical cross talk is substantially reduced;

said optical assembly means being thin as compared to the thickness of said incident light glass substrate and being disposed between said liquid crystal assembly means and said microlens means at about said surface of engagement with paid liquid crystal assembly means for determining the focal distance by spacing said microlens means from said liquid crystal assembly means;

said optical assembly means includes a plurality of individual interface filters corresponding to said lenslets and pixel elements and aligned in registration therewith for passing selectively incident light therethrough to facilitate the generation of a full color image, at least one neutral density layer disposed between said lenslets and said surface for adjusting said focal distance, and an insulation layer disposed between the neutral density layer and the lenslets to reduce the amount of heat produced by the interaction of the light with said filters; and a light source for producing the light to illuminate said liquid crystal projection panel construction; and a projection lens means for projecting the image.

* * * * *